May 5, 1925.
K. W. BARTLETT
LIQUID TREATING APPARATUS
Filed May 26, 1924
1,536,063
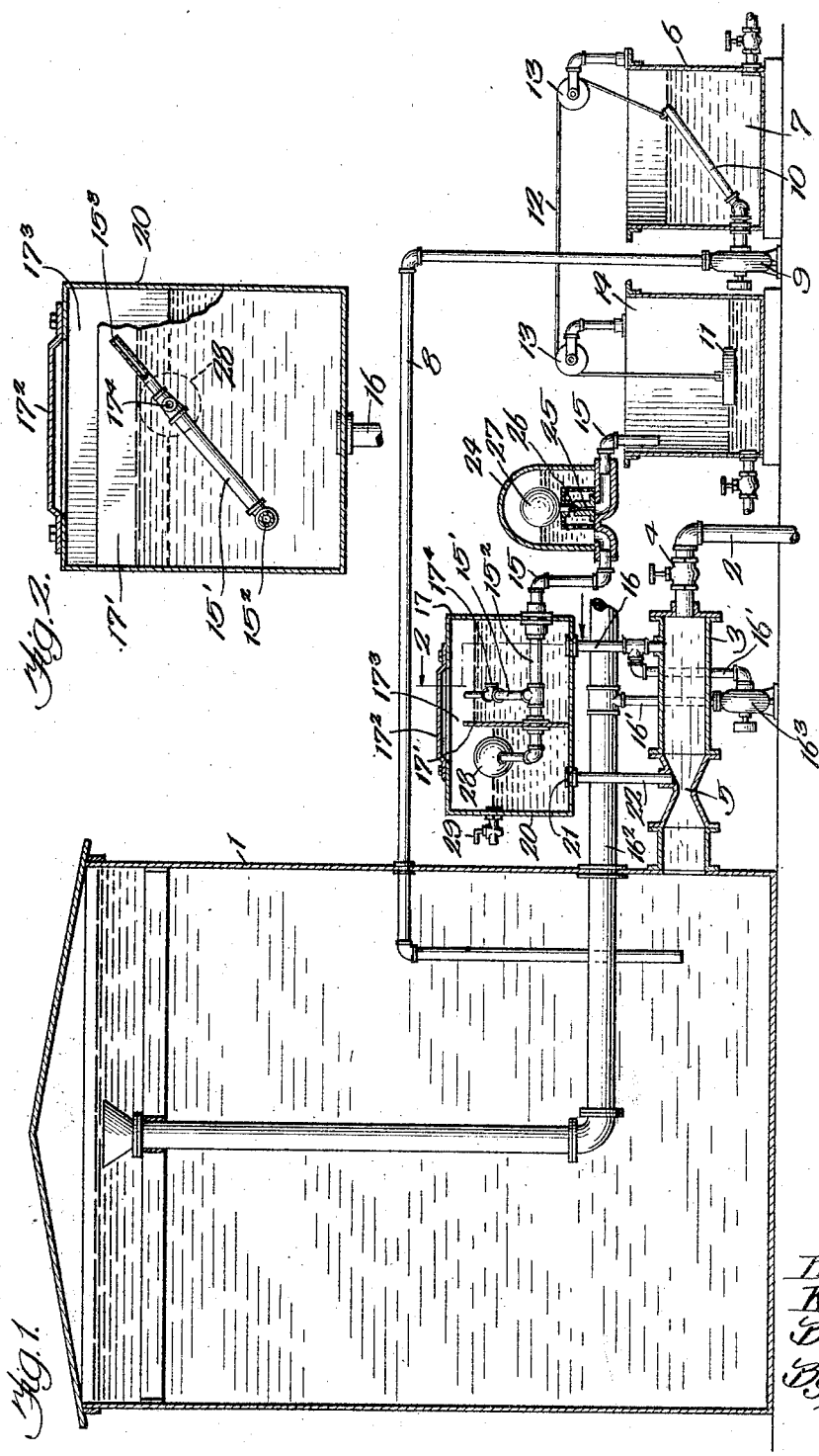
Inventor
Kent W. Bartlett.

Patented May 5, 1925.

1,536,063

UNITED STATES PATENT OFFICE.

KENT W. BARTLETT, OF HAMMOND, INDIANA.

LIQUID-TREATING APPARATUS.

Application filed May 26, 1924. Serial No. 715,998.

*To all whom it may concern:*

Be it known that I, KENT W. BARTLETT, a citizen of the United States, residing at Hammond, in the county of Lake and the State of Indiana, have invented a certain new and useful Improvement in Liquid-Treating Apparatus, of which the following is a full, clear, concise, and exact description.

My invention relates to liquid treating apparatus and is of particular service in softening water.

The invention has for its object the provision of improved means for controlling the mechanism which is employed for regulating the flow of chemical from the chemical source to the water that is to be softened or to the liquid that is to be treated.

In practicing my invention, piping is employed for supplying the water or other liquid that is to be treated to a settling or treatment tank, this piping having a constricted outlet discharging into the tank below its limiting level. A portion of the treated liquid controls the mechanism which governs the flow of chemical, this controlling liquid flowing through an orifice which is small in comparison with the aforesaid constricted outlet. Means are further employed which enable the pressure of the raw liquid to produce feeding pressure upon the controlling liquid. This means is preferably inclusive of an atmospheric or other gaseous medium interposed between the entering side of said outlet at a place neighboring the same and a place where the raw liquid exerts greater pressure. In the preferred embodiment of the invention, a receptacle is employed having an inlet communicating with the raw liquid piping where the lesser pressure is exerted by the raw liquid, and a second receptacle communicating with the raw liquid piping where the pressure is greater and having the aforesaid orifice which is adjustable in position by the liquid in the first receptacle and communicating with the first receptacle through a passage that is above said inlet, there being sealed space in both receptacles placed in communication by said passage, in which space the gaseous medium is trapped.

The invention will be more fully explained in connection with the accompanying drawing in which Fig. 1 is a view in section, somewhat diagrammatic, illustrating the preferred embodiment of the invention, and Fig. 2 is a cross sectional view of part of the apparatus.

The treatment or settling tank 1 receives the water or other liquid that is to be treated through incoming piping 2, having an enlargement 3 adjacent the piping and desirably having a cut off valve 4. The liquid is discharged into the tank through an outlet 5 which is constricted with respect to the bores of the piping 2 and its enlargement 3, the liquid being admitted to the tank near the bottom thereof. A source of chemical is illustrated in the form of a chemical tank 6 which holds the chemical 7, such as $Ca(OH)_2$ and $Na_2CO_3$, where water is being softened. Chemical from the source of chemical is supplied into the treatment tank 1 through piping 8, whose discharge end is located near the incoming raw liquid. The chemical is forced through pipe 8 by means of a pump 9 into which the chemical flows through the swinging pipe 10, mounted in the chemical tank 6. The position of this swinging pipe is governed by a float 11 that is connected with the pipe 10 by means of a cable 12 passing over sheaves 13. The float tank 14, which contains the float 11, receives the fractional portion of the liquid which governs the flow of chemical into the treatment tank, through piping 15, 16. The latter piping communicates with a receptacle 17. In the embodiment of the invention shown, the piping 16 receives liquid from the piping 16' leading from the soft water outlet pipe 16². The piping 16 also communicates with the pipe portion 3 to be subject to the pressure of the water in this pipe portion. A pump 16³ pumps treated water from the tank 1 through the piping 16' at a slightly greater pressure at the pipe 16 than that exerted by the water in the pipe portion 3, so that the raw water will not pass upwardly into the receptacle 17, whereby deposit will be prevented from forming in the pipe 16, the pressure exerted by the raw liquid preventing flow of the treated liquid into the raw water pipe.

Another stationary sealed receptacle 20 is employed which has an inlet 21 at its bottom through which liquid is admitted from the pipe portion 3 at the entering side of the outlet 5 by way of piping 22. The receptacles 17 and 20 may be formed of a single box divided by a partition 17' to form the receptacles and terminating short of the sealing top 17² to form a passage 17³ that places the tops of the receptacles in communication. The piping 15 has a trap 24 connected therein into which the controlling liquid is first admitted from the receptacle 17 through the restricted orifice 17⁴ and from which the flow of this liquid is continued to the float tank 14. The liquid issues from the trap 24 through a port 25 having a valve 26 which is governed by a float 27 riding upon the liquid in the trap.

The orifice 17⁴ is provided in the upper end of a branch pipe 15′ of the rotatable section 15² of the piping 15. The pipe section 15 passes through a sealed joint in partition 17′ and is closed within the receptacle 20. A float 28 is carried upon an angular extension of the pipe section 15² and rides upon the liquid within receptacle 20. This float and the orifice 17⁴ are so related that said orifice is maintained fixed with respect to and preferably at the level of the liquid in the receptacle 20, there being an air nipple 15³ establishing communication between the pipe portion 15′ and the air trapped in the receptacles 17 and 20 above the liquids therein. The head of liquid above the orifice 17⁴ determines the amount of controlling treated liquid passing to the float tank 14. This head varies with the variation in the difference in pressures of the raw liquid, at the pipe 16 and the outlet 5, the pump 16³ being controlled to maintain the pressure of the treated liquid supplied to the tank 17 just slightly in excess of the maximum pressure exerted by the raw liquid at the pipe 16. An air vent valve 29 may be employed to establish communication with the external air in adjusting the apparatus for operation.

Changes may be made without departing from my invention.

Having thus described my invention, I claim:

1. In a liquid treating apparatus, the combination with a tank for receiving liquid to be treated; of piping for supplying liquid to be treated and having a constricted outlet discharging into the tank below its limiting level; a source of chemical in communication with said tank; mechanism, governed by treated liquid passed through an orifice small in comparison to said outlet, for regulating the flow of chemical from said source to said tank; and means for controlling the flow of the controlling treated liquid inclusive of a gaseous medium subject to the pressure of the raw liquid at the entering side of said outlet and the greater pressure of the raw liquid at the remoter point in said piping.

2. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means controlled by the liquid in the first receptacle for maintaining said orifice in substantially fixed position with respect to the liquid level in the first receptacle; and a trap receiving liquid from the second receptacle and discharging the same to the liquid controlled mechanism to control the same.

3. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means for maintaining said orifice in substantially fixed position with respect to the liquid level in the first receptacle, inclusive of a float riding upon the liquid in the first receptacle in adjusting relation to said orifice; and a trap receiving liquid from the second receptacle and discharging the same to the liquid controlled mechanism to control the same.

4. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means for maintaining said orifice in substantially fixed position with respect to the liquid level in the first receptacle, inclusive of a float riding upon the liquid in the first receptacle, a pipe mounted to turn and connected with the float to be turned thereby as the float rises and falls, said pipe having the aforesaid orifice that receives the liquid from the second receptacle; and a trap receiving liquid from the second receptacle and discharging the same to the liquid controlled mechanism to control this mechanism and sealed to hold gas above the liquid therein.

5. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means controlled by the liquid in the first receptacle for maintaining said orifice in substantially fixed position with respect to the liquid level in the first receptacle, said second receptacle being also in communication with said piping and subject to the pressure of the liquid in the piping that is opposite to but less than the pressure impressed by the treated liquid; and a trap receiving liquid from the second receptacle and discharging the same to the liquid controlled mechanism to control the same.

6. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means for maintaining said orifice in substantially fixed position with respect to the liquid level in the first receptacle, inclusive of a float riding upon the liquid in the first receptacle in adjusting relation to said orifice; said second receptacle being also in communication with said piping and subject to the pressure of the liquid in the piping that is opposite to but less than the pressure impressed by the treated liquid; and a trap receiving liquid from the second receptacle and discharging the same to the liquid controlled mechanism to control the same.

7. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with said piping at the entering side of said outlet; a second receptacle receiving treated liquid under greater pressure than that impressed upon the liquid entering the first receptacle, said greater pressure being regulated by the liquid in a portion of said piping remote from said outlet, the second receptacle communicating with the first through a passage that is above said inlet, there being sealed gas holding space in each receptacle placed in communication with the gas holding space in the other by said passage, there also being an orifice adjustable in position and small in comparison to said outlet, through which controlling treated liquid is discharged from the second receptacle; means for maintaining said orifice in substantially fixed position with respect to the liquid level in the first receptacle, inclusive of a float riding upon the liquid in the first receptacle, a pipe mounted to turn and connected with the float to be turned thereby as the float rises and falls, said pipe having the aforesaid orifice that receives the liquid from the second receptacle, said second receptacle being also in communication with said piping and subject to the pressure of the liquid in the piping that is opposite to but less than the pressure impressed by the treated liquid; and a trap receiving liquid from the second receptacle and discharging the same to the liquid controlled mechanism to control the same.

In witness whereof, I hereunto subscribe my name.

KENT W. BARTLETT.